(12) United States Patent
Venkataramani

(10) Patent No.: US 12,602,473 B1
(45) Date of Patent: Apr. 14, 2026

(54) USING INTERMEDIATE MAPPINGS TO PREVENT DATA LOSS FROM RANSOMWARE

(71) Applicant: Amazon Technologies, Inc., Seattle, WA (US)

(72) Inventor: Eknath Venkataramani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 286 days.

(21) Appl. No.: 17/661,725

(22) Filed: May 2, 2022

(51) Int. Cl.
*G06F 21/56* (2013.01)
*G06F 21/62* (2013.01)

(52) U.S. Cl.
CPC .......... *G06F 21/56* (2013.01); *G06F 21/6227* (2013.01)

(58) Field of Classification Search
CPC .............................. G06F 21/56; G06F 21/6227
See application file for complete search history.

(56) References Cited

U.S. PATENT DOCUMENTS

| | | | | |
|---|---|---|---|---|
| 6,898,681 | B2 * | 5/2005 | Young | ................. G06F 11/1446 |
| | | | | 714/E11.119 |
| 7,958,554 | B2 | 6/2011 | Chow et al. | |
| 9,195,828 | B2 | 11/2015 | Ngair | |
| 9,842,128 | B2 * | 12/2017 | Talagala | ................. G06F 3/0679 |
| 11,175,984 | B1 * | 11/2021 | Lercari | ............... G06F 11/0784 |
| 11,907,200 | B2 * | 2/2024 | Talagala | .............. G06F 12/0804 |
| 2006/0155946 | A1 * | 7/2006 | Ji | ............................ G06F 3/065 |
| | | | | 711/162 |
| 2012/0198205 | A1 * | 8/2012 | Eilert | .................... G06F 11/302 |
| | | | | 711/206 |
| 2017/0199679 | A1 * | 7/2017 | Patocka | ................. G06F 3/064 |
| 2020/0159425 | A1 * | 5/2020 | Flynn | ................... G06F 3/0679 |
| 2021/0034606 | A1 * | 2/2021 | Stamos | ............... G06F 16/2379 |

\* cited by examiner

*Primary Examiner* — Azizul Choudhury
(74) *Attorney, Agent, or Firm* — Robert C. Kowert; Kowert, Hood, Munyon, Rankin & Goetzel, P.C.

(57) ABSTRACT

A storage driver for a storage space (e.g., hard disk volume) may use intermediate mappings for write, create, and delete requests to prevent data loss from ransomware. The storage driver receives a request to overwrite a data item (e.g., file or object) at a first location of a storage space and in response, writes data to a second location of the storage space. The storage driver also generates a write mapping that associates the first location with the second location. At a later point in time, the storage driver may determine whether to commit the request to overwrite the data item. If the storage driver determines not to commit the request to overwrite the data item (due to the data being the result of a ransomware attack), then the storage driver deletes the write mapping, preventing the first location from being overwritten (preventing data loss from a ransomware attack).

20 Claims, 11 Drawing Sheets

*Storage driver receives a
request to read data from a
data item at an intended
location of a storage space*
502

*Does a
write mapping exist
for the intended location?*
504

Yes

No

*Based on the write mapping,
return data of a data item from
a temporary location*
508

*Storage driver returns data of the
data item from the intended
location*
506

*Storage driver receives a request to delete a data item at a location of a storage space*
702

*Storage driver generates a delete mapping that associates the location with the request to delete*
704

*Storage driver stores the delete mapping in a memory*
706

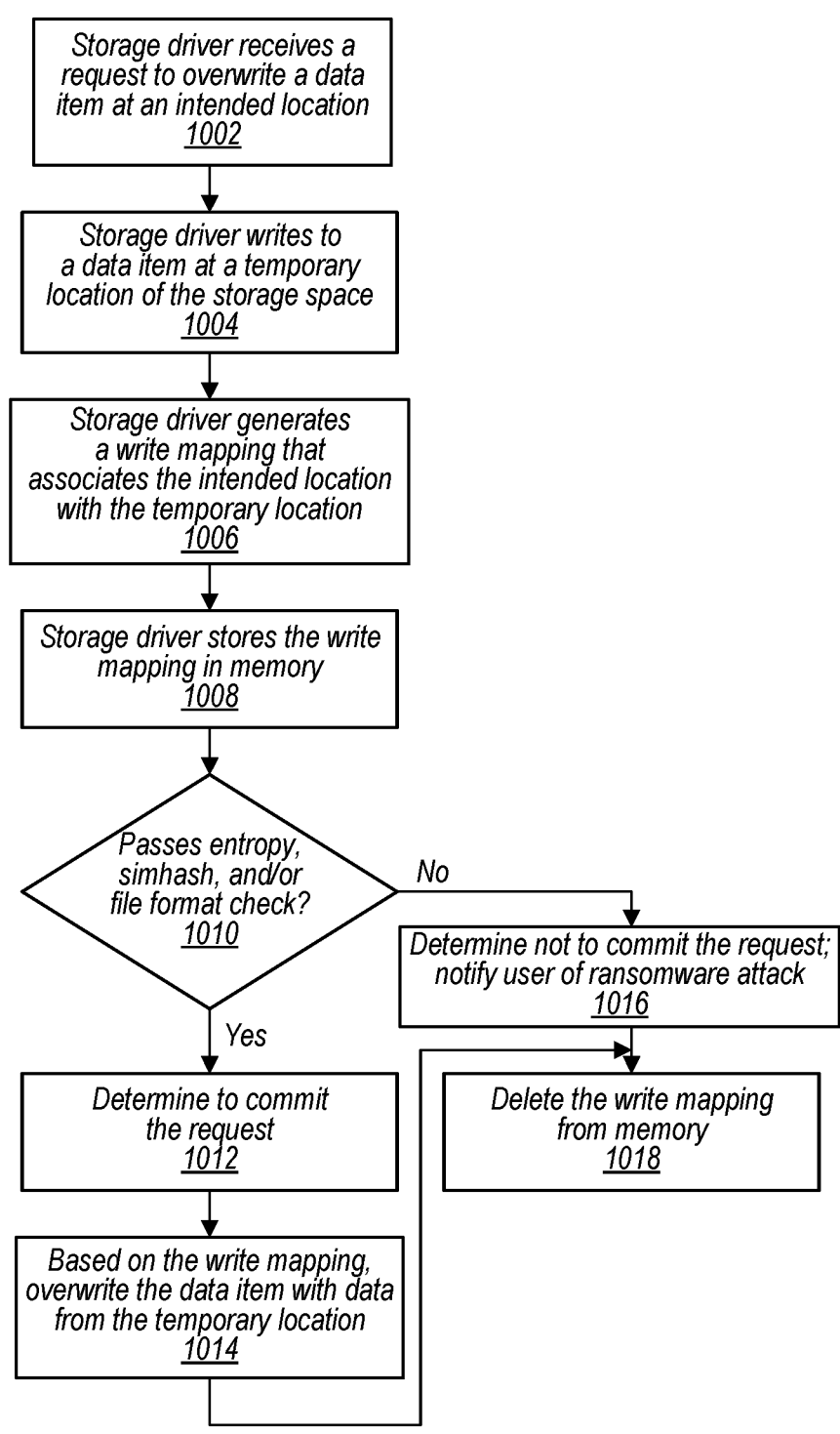

Storage driver receives a
request to overwrite a data
item at an intended location
1002

Storage driver writes to
a data item at a temporary
location of the storage space
1004

Storage driver generates
a write mapping that
associates the intended location
with the temporary location
1006

Storage driver stores the write
mapping in memory
1008

Passes entropy,
simhash, and/or
file format check?
1010

No

Determine not to commit the request;
notify user of ransomware attack
1016

Yes

Determine to commit
the request
1012

Delete the write mapping
from memory
1018

Based on the write mapping,
overwrite the data item with data
from the temporary location
1014

FIG. 10

USING INTERMEDIATE MAPPINGS TO PREVENT DATA LOSS FROM RANSOMWARE

BACKGROUND

The amount of personal and business data that is stored on computing systems continues to grow every day. To take advantage of this, some malicious actors employ ransomware attacks in order to extort money from victims. Ransomware is a type of malicious software that may prevent a user from accessing files (or any other type of data item) on their own computing system and may demand the user to pay a ransom to the malicious actor in order to access the files. For example, a user's files may be encrypted and the user may be unable to decrypt the files without a decryption key in possession of the malicious actor.

There are two common ways of recovering from a ransom attack. A victim may pay the ransom, receive the decryption key, and decrypt the files using the decryption key to recover data. Another way to recover is to make periodic backups to an external location and restore the backups after a ransomware attack has occurred. Although making periodic backups may allow a user to avoid paying a ransom in order to recover data, the process results in backup data becoming stale as the time since the last backup has occurred. Making backups at a higher frequency may reduce the staleness of data in between backups, but the higher frequency of backups results in higher operational costs (e.g., more bandwidth consumption, more downtime).

BRIEF DESCRIPTION OF THE DRAWINGS

FIG. 10 is a high-level flowchart illustrating various methods and techniques for a storage driver to automatically determine whether or not to commit an overwrite request based on one or more similarity checks, according to some embodiments.

Figure 1:
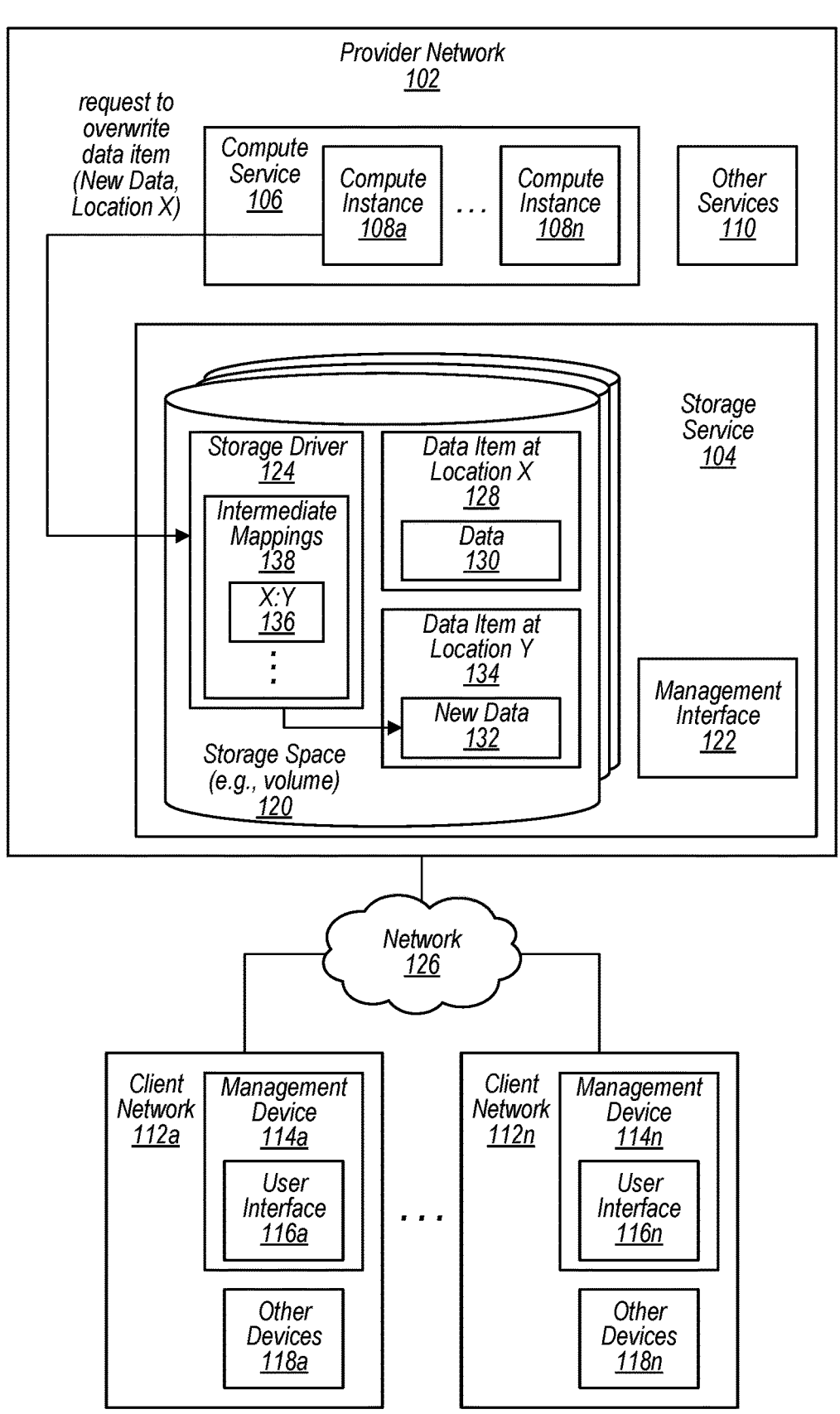
FIG. 1 is a logical block diagram illustrating a system for using intermediate mappings to prevent data loss from ransomware, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to use intermediate mappings prevent data loss from ransomware, according to some embodiments. In various embodiments, data loss from a ransomware attack may be prevented, without the need to make frequent backups to another location (e.g., an external and/or remote location that is protected from attacks). Embodiments may prevent data loss from ransomware attacks while avoiding the staleness of data and/or the higher bandwidth consumption resulting from traditional techniques of frequent/periodic backups.

Embodiments may prevent data loss due to an "overwrite" ransomware attack ("overwrite attack") and/or a "delete and create" ransomware attack ("delete-create attack"). In each case, the ransomware may first identify any number of assets (data items such as files, objects, etc.) to encrypt as part of the ransomware attack. The ransomware may identify data items using any technique. For example, the ransomware may identify all data items in a storage space (e.g., a particular volume of a hard disk or a virtual hard disk) or identify data item(s) in the storage space that have a certain extension(s) (e.g., txt or doc). For example, ransomware may identify all files that have a txt or doc extension or ransomware may identify all images with a gif extension.

As used herein, a "data item" may refer to a file, an object, or any other type of structured or unstructured data, in various embodiments. For example, a data item may be a file named a.txt, which may include any number of characters and/or words that are structured according to a particular format for files that have a "txt" extension. As another example, a data item may be an object named image.gif, which may be unstructured (or semi-structured) data representing an image. In some embodiments, an object may include data that represents an image, video, or other unstructured data or semi-structured data.

In embodiments, a storage space may be an accessible storage area that can store any number of data items at any number of locations (e.g., logical addresses) and the data items may be accessible via any number of data item system commands and/or requests (e.g., request to read, write, overwrite, delete, create). In embodiments, one or more storage devices (hard disks, solid state drives, and/or any other type of storage device) may be used to implement the storage space and to store the data/contents of the data items. In embodiments, a storage space may serve as a type of logical container for a data item system and may provide a structure for accessing data item data (e.g., accessing data by an application or by a user via commands). In various embodiments, a "storage space" may refer to a "volume" of a disk or virtual disk.

During an overwrite attack, for each identified data item of a storage space, the ransomware may read the data of the data item (e.g., a file's content) into memory (e.g., random access memory (RAM)), encrypt the data item data in memory (using an encryption key), and then issue an overwrite request to overwrite the existing data item data with the encrypted data item data. The user may be notified how to decrypt the data items after making a payment. Embodiments described herein may be utilized to prevent data loss due to an overwrite attack. In embodiments, a storage driver may receive a request to overwrite a data item at a first location of a storage space and in response, write data to a second location of the storage space and generate an intermediate write mapping that associates the first location with the second location.

In embodiments, an overwrite request may be a request to overwrite the existing data of a data item with new data (e.g., replace the existing data of the data item with the new data). The new data to replace the existing data may be included as part of the overwrite request or may be referenced by the request.

At a later point in time, the storage driver may determine whether to commit the request to overwrite the data item. If the storage driver determines to commit the request to overwrite the data item (e.g., in response to determining the data is legitimate, unencrypted, and/or not the result of an attack), then the storage driver may overwrite the data item at the first location with the data from the second location (based on the intermediate write mapping). If not (e.g., in response to determining the data is not legitimate, is encrypted, and/or is the result of an attack), then the storage driver may cause the intermediate write mapping to be deleted from memory (e.g., via a reboot or other command). Deleting (e.g., removing) the intermediate write mapping from memory prevents the data item at the first location from being overwritten by the data from the second location. The above actions may prevent data loss from the overwrite attack.

During a delete-create attack, for each identified data item of a storage space, the ransomware may read the data of the data item (e.g., a file's content) into memory (e.g., RAM), encrypt the data item data in memory (using an encryption key), delete the existing/original data item from the storage space, and create a new data item in the storage space with the encrypted data item data. The above steps may be performed in any order. The user may be notified how to decrypt the data items after making a payment. Embodiments may prevent data loss due to a delete-create attack. In embodiments, a storage driver may receive a request to delete a data item at a first location of a storage space and in response, generate an intermediate delete mapping that associates the first location with the request to delete.

At a later point in time, the storage driver may determine whether to commit the request to delete the data item. If the storage driver determines to commit the request to delete the data item (e.g., in response to determining the request is legitimate and/or not the result of an attack), then the storage driver may delete the data item at the first location (based on the intermediate delete mapping). If not (e.g., in response to determining the data is not legitimate, is encrypted, and/or is the result of an attack), then the storage driver may cause the intermediate delete mapping to be deleted from memory (e.g., via a reboot or other command). Deleting the intermediate delete mapping from memory prevents the data item at the first location from being deleted. As discussed herein, a same/similar process may be performed to handle a request to create a data item. The above actions may prevent data loss from the delete-create attack.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 11 and described below.

This specification begins with a description of a system for using intermediate mappings to prevent data loss from ransomware. A number of different methods and techniques for using intermediate mappings to prevent data loss from ransomware are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for using intermediate mappings to prevent data loss from ransomware, according to some embodiments.

As shown, a provider network 102 includes a storage service 104 that implements intermediate mappings to prevent data loss from ransomware. The provider network also includes a compute service 106 that may establish and run any number of compute instances 108 on behalf of any number of clients. In the example embodiment, the provider network 102 also includes any number of other services 110, such as compute services and/or storage services.

In embodiments, any of the compute and/or storage functionality described for the storage service 104 may be provided, at least in part, by one or more of the other services 106 and/or the compute service 106. For example, another service may maintain a registry that identifies the clients of the storage service 104 or a registry that identifies which compute instances are owned/managed by which clients.

In embodiments, any number of clients of the storage service 104 may each own/manage one or more client networks 112, and a given client network may include at least one management device 114 that implements a user interface 116, as well as any number of other computing devices 118. For example, client network 110a of client A includes the management device 114a as well as any number of other devices 118. In embodiments, clients of the storage service 104 may manage any number of compute instances that may use a storage space 120 to store data item data for use by the compute instance(s). For example, client A may manage compute instance 108a, which may include an application that uses the storage space 120a to store data generated and/or used by the application.

As depicted, the storage service 104 includes a management interface 122 (e.g., a management API) that may receive user input (e.g., to configure a storage driver 124) from a management device 114 of a remote client network 112 (e.g., via a user interface 116 of the management device). For example, a user may provide input via a graphical user interface or command line interface of a display of the management device. For example, the management interface 122 may receive user input from the management device 114a of the client network 112a of a client. A management device 114 may communicate with the provider network 102 from a remote client network 110 of the corresponding client (e.g., via a wide area network 126, such as the internet).

In some embodiments, the user input may configure the storage driver to perform any of the actions described herein. For example, the user may set a predefined entropy threshold, set a predefined similarity threshold, set a threshold amount of the storage space being used as temporary storage of data for requests that have not yet been committed, and/or configure a storage driver to determine whether to automatically commit a request to overwrite data based on the measurement of entropy or the format of the data items, as described herein. In embodiments, the user input may cause the storage driver to commit and/or to not commit any number of requests sent to the storage space, as described herein (e.g., requests to overwrite a data item, read a data item, create a new data item, delete a data item).

In the example embodiment, client A (owner of client network 112a) may manage compute instance 108a, which may be configured by the client to use storage space 120 to access/use data item data. For example, the compute instance 108a may execute an application that uses the storage space 120a to store data (e.g., as data item data in any number of data items) generated by the application and/or retrieved by the application.

In embodiments, the compute instance 108a (e.g., a software application running on the instance) may send a request to the storage space 120 to overwrite a data item at a first location of the storage space 120 (data item at location X 128); the request indicates the new data to overwrite the data item with. For example, the request may include the new data to overwrite the data item with. As shown, the data item at location X 128 currently includes data 130.

In response to receiving the request to overwrite the data item at location X 128, the storage driver may write the new data 132 to a second (different) location of the storage space (data item at location Y 134). In embodiments, the second location may be within a contiguous storage area that is reserved for use to store data for requests temporarily, before the storage driver determines whether to commit the data for the requests. In embodiments, the contiguous storage area may temporarily store data for any number of requests.

The storage driver may generate an intermediate write mapping 136, wherein the intermediate write mapping 136 associates the first location (location X 128) with the second location (location Y 134), represented as "X: Y" in the depicted example. The mapping may indicate that the two locations are mapped to each other. The generation of the intermediate write mapping 136 may occur before, during, or concurrent with the writing of the data to the second location. The storage driver may then store the intermediate write mapping to a memory (e.g., to RAM or another data store). In embodiments, the storage driver 128 may store any number of intermediate mappings 138 to the memory (e.g., any number of intermediate write mappings, intermediate delete mappings, and/or intermediate create mappings as described herein).

At a later point in time, the storage driver may determine to commit the request. In response, the storage driver may, based on the intermediate write mapping, overwrite the data item at the first location with the data from the second location. The intermediate write mapping may then be deleted from memory.

In some embodiments an entropy check may be used to determine whether to commit a request Such an embodiment may include determining that a measurement of entropy of data (e.g., data the data item) at the first location is within a predefined entropy threshold of a measurement of entropy of the data at the second location (e.g., within a numerical threshold of entropy using a numerical entropy scale for the measurements of entropy). For example, if a scale of 0 to 8 is used to measure the entropy of data, then the predefined threshold may be configured to be 1.5 based on user input. Therefore, if the respective entropy scores are 6 and 7, then the storage driver may determine to commit the request. Conversely, if the respective entropy scores are 4 and 7, then the storage driver may determine not to commit the request.

In some embodiments, a similarity hash (simhash) of data may be used to determine whether to commit a request. For two given documents, the more similar the content is between each document, the more similar the hash values of each document are. For example, if document A and document B have the same 10 paragraphs, except the last sentence is missing from document B, then the simhashes of each document will be very similar to each other. However, if document B is encrypted, then the simhashes may be very different from each other.

In embodiments that perform a simhash check, determining to commit the request may include determining that a simhash of data (e.g., data of the data item) at the first location is within a predefined similarity threshold of a simhash of the data (e.g., data of the data item) at the second location (e.g., numerical similarity score for similarity between the first simhash and the second simhash is at or above a minimum score). For example, if a scale of 0 to 10 is used to measure the similarity between two simhashes, then the predefined similarity threshold may be configured to be 8 or more based on user input. In that case, if the storage driver determines that the similarity score between the two simhashes is 8.5 out of 10, then the storage driver may determine to commit the request. Conversely, if the similarity score between the two simhashes is 7 out of 10, then the storage driver may determine not to commit the request In some embodiments a format check may be used to determine whether to commit a request. This may include determining that a format (or custom format) of the data item at the first location is a same format (or custom format) as a format of another data item at the second location (e.g., a data item that includes the data indicated by the request to overwrite). Conversely, determining not to commit the request may include determining that a format of the data item at the first location is not the same format as a format of another data item at the second location. For example, if both data items have a "txt" extension, indicating they have the same format, then the storage driver may determine to commit the request. In some embodiments, both data items may have the same custom data item format, in which particular labels or fields are present in one or more particular lines of the data item (e.g., a timestamp field is in the first line of the file, a temperature measurement is in the second line). In some embodiments, the storage driver may receive, from a user, an indication to commit the request to overwrite the data item and in response to the receiving the indication, the storage driver may determine to commit the request (e.g., manual committing of the request based on user input).

Figure 2:
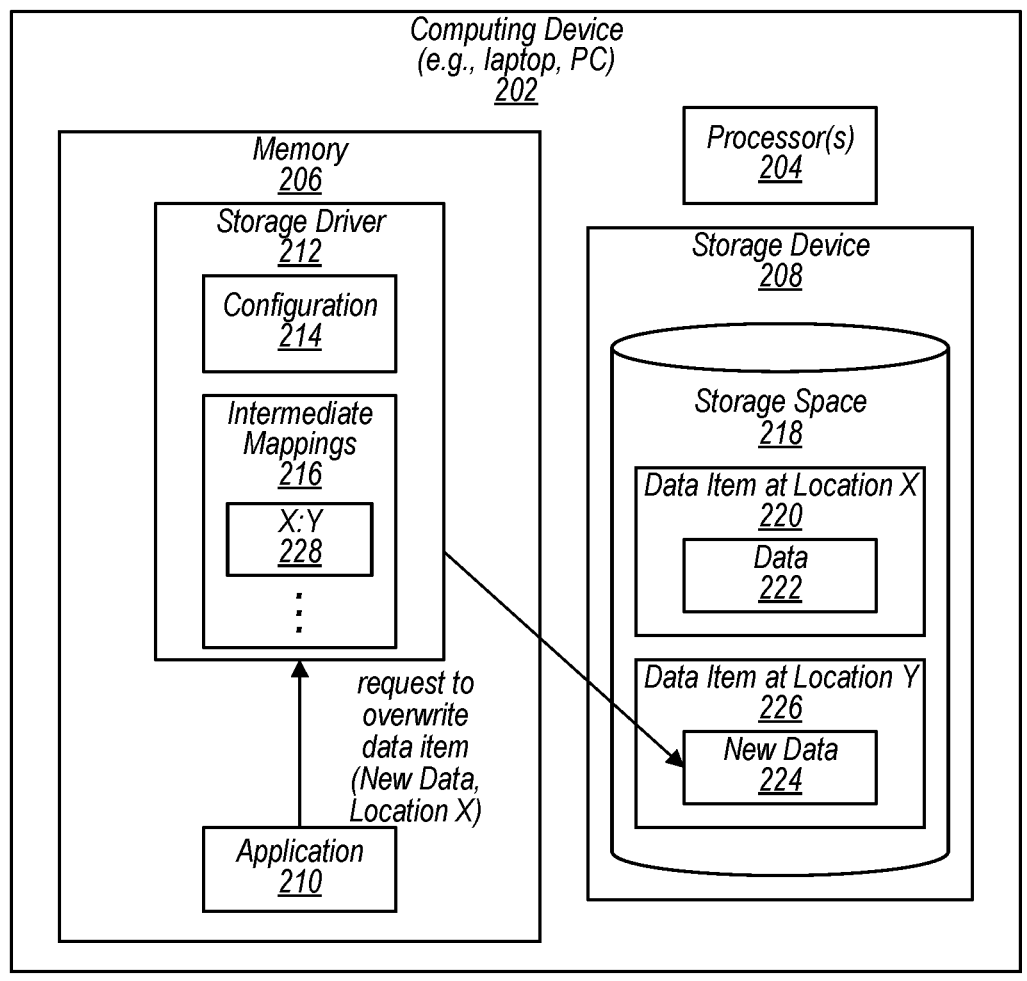
FIG. 2 is a logical block diagram illustrating a system for using intermediate mappings to prevent data loss from ransomware, according to some embodiments.

FIG. 2 is a logical block diagram illustrating a system for using intermediate mappings to prevent data loss from ransomware, according to some embodiments.

In the depicted example, a computing device 202 may be a laptop, personal computer, mobile device (e.g., smart phone or any other mobile computing device), or any other type of computing device of a user (e.g., a personal computing device of a user's private home or office network, or connected to a public network via a public WiFi access). The computing device may be a computer system of the embodiment illustrated in FIG. 11 (or the same in at least some aspects/components).

The computing device 202 includes one or more processors 204, memory 206, and a storage device 208. The memory 206 includes an application 210 executed by the one or more processors 204 and a storage driver 212 executed by the one or more processors 204. The storage driver 212 includes configuration data 214 and any number of intermediate mappings 216. The configuration data 214 may include data based on user input, and the configuration data may be used by the storage driver 212 to configure the storage driver to perform any of the actions described for FIG. 1 with respect to user input. The storage device includes a storage space 218 that may store any number of data items.

In various embodiments, the components of FIG. 2 may operate in the same or similar manner as the corresponding components of FIG. 1. For example, the storage driver 212 may receive, from the application, a request to overwrite a data item (e.g., the data item at location X 220, which has data item data 222). In response to receiving the request to overwrite the data item at location X 220, the storage driver may write the new data 224 to a second (different) location of the storage space (data item at location Y 226). In embodiments, the second location may be within a contiguous storage area that is reserved for use to store data for requests temporarily, before the storage driver determines whether to commit the data for the requests. In embodiments, the contiguous storage area may temporarily store data for any number of requests.

The storage driver may generate an intermediate write mapping 228, wherein the intermediate write mapping 228 associates the first location (location X 220) with the second location (location Y 226), represented as "X:Y" in the depicted example. The mapping may indicate that the two locations are mapped to each other. The generation of the intermediate write mapping 228 may occur before, during, or concurrent with the writing of the data to the second location. The storage driver may then store the intermediate write mapping to a memory (e.g., to RAM (e.g., memory 206) or another data store). In embodiments, the storage driver may store any number of intermediate mappings 216 to the memory (e.g., any number of intermediate write mappings, intermediate delete mappings, and/or intermediate create mappings as described herein).

At a later point in time, the storage driver may determine to commit the request. In response, the storage driver may, based on the intermediate write mapping, overwrite the data item at the first location with the data from the second location. The intermediate write mapping may then be deleted from memory.

Any of the determinations/actions of the storage driver discussed for FIG. 1 may apply for FIG. 2 as well. For example, determining to commit the request may include determining that a measurement of entropy of data (e.g., data of the data item) at the first location is within a predefined entropy threshold of a measurement of entropy of the data at the second location (e.g., within a numerical threshold of entropy using a numerical entropy scale). For example, if a scale of 0 to 8 is used to measure the entropy of data, then the predefined threshold may be configured to be 1.5 based on user input. Therefore, if the respective entropy scores are 6 and 7, then the storage driver may determine to commit the request. Conversely, if the respective entropy scores are 4 and 7, then the storage driver may determine not to commit the request.

In embodiments, a similarity hash (simhash) of data may be used to determine whether to commit a request. For two given documents, the more similar the content is between each document, the more similar the hash values of each document are. For example, if document A and document B have the same 10 paragraphs, except the last sentence is missing from document B, then the simhashes of each document will be very similar to each other. However, if document B is encrypted, then the simhashes may be very different from each other.

In embodiments that perform a simhash check, determining to commit the request may include determining that a simhash of data (e.g., data of the data item) at the first location is within a predefined similarity threshold of a simhash of the data at the second location (e.g., numerical similarity score for similarity between the first simhash and the second simhash is at or above a minimum score). For example, if a scale of 0 to 10 is used to measure the similarity between two simhashes, then the predefined similarity threshold may be configured to be 8 or more based on user input. In that case, if the storage driver determines that the similarity score between the two simhashes is 8.5 out of 10, then the storage driver may determine to commit the request. Conversely, if the similarity score between the two simhashes is 7 out of 10, then the storage driver may determine not to commit the request.

In some embodiments, determining to commit the request may include determining that a format/custom format of the data item at the first location is a same format/custom format as a format of another data item at the second location (e.g., a data item that includes the data indicated by the request to overwrite). Conversely, determining not to commit the request may include determining that a format of the data item at the first location is not the same format as a format of another data item at the second location. For example, if both data items have a "txt" extension, indicating they have the same format, then the storage driver may determine to commit the request.

In some embodiments, both data items may have the same custom data item format, in which particular labels or fields are present in one or more particular lines of the data item (e.g., a timestamp field is in the first line of the data item, a temperature measurement is in the second line). In some embodiments, the storage driver may receive, from a user, an indication to commit the request to overwrite the data item and in response to the receiving of the indication, the storage driver may determine to commit the request (e.g., manual committing of the request based on user input).

Figure 3A:
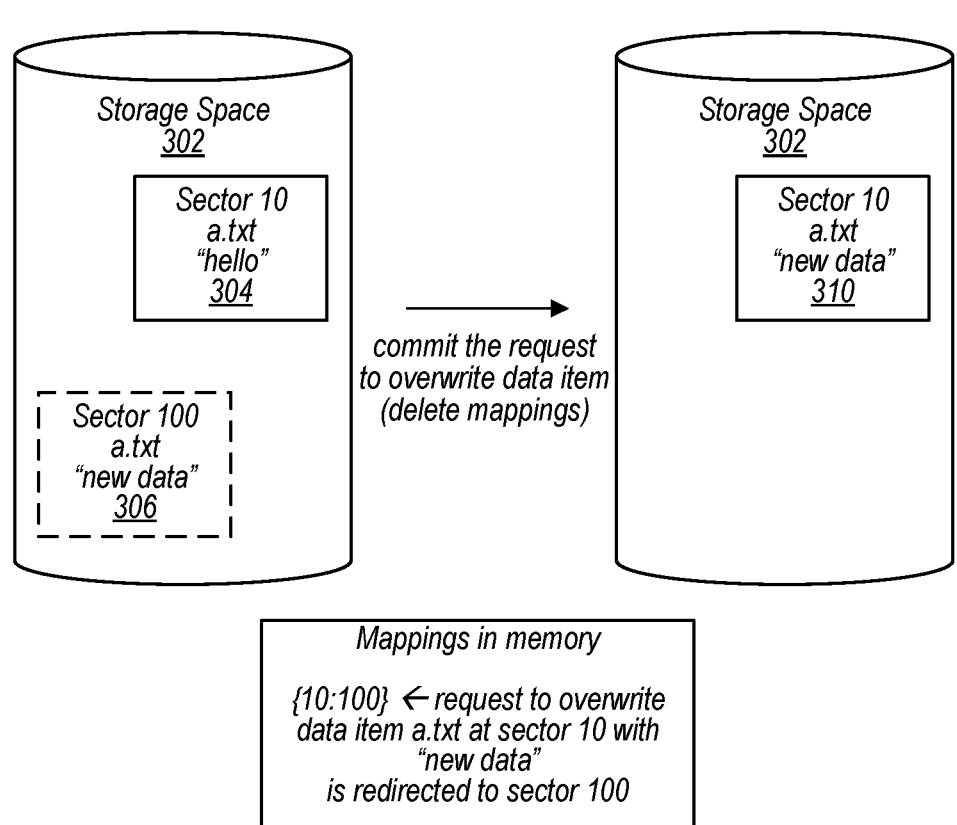
FIG. 3A is an illustration of contents of a volume before and after a determination to commit an overwrite request to overwrite an existing data item, according to some embodiments.

FIG. 3A is an illustration of contents of a storage space before and after a determination to commit a request to overwrite a data item, according to some embodiments. In embodiments, any of FIGS. 3A-FIG. 11 may apply to the system of FIG. 1 or FIG. 2.

In the depicted example, in response to receiving a request to overwrite the data item at a first location (sector 10) of a storage space 302 (the data item a.txt, which includes the data item data "hello" 304), the storage driver may write the new data ("new data" 306) to a second (different) location of the storage space (data item a.txt at sector 100). In other words, the request to overwrite is redirected to sector 100, where a data item (a.txt) may be generated and overwritten with the new data. The storage driver may generate an intermediate write mapping 308, wherein the intermediate write mapping 308 associates the first location (sector 10) with the second location (sector 100), represented as "10: 100" in the depicted example. The storage driver may then store the intermediate write mapping 308 to a memory (e.g., to RAM or another data store). Although a "sector" is used in this example to identify a data item location, in various embodiments any type of file system representation of a data item location may be used (e.g., a byte range, storage address, storage address range, sector, etc.).

The storage driver may determine to commit the request to overwrite (e.g., based on any of the techniques described herein). In response, as shown on the right, the data item a.txt at sector 10 is overwritten with the data item data "new data" 310, the data item a.txt at sector 100 is deleted, and the intermediate write mapping (10:100) is deleted from the memory. In embodiments, the process of committing the request may be improved/optimized in order to reduce the amount of time and/or resources that are used to commit. For example, instead of overwriting the data item a.txt at sector 10, the storage driver may update the intermediate mapping/ data item location information for data item a.txt (e.g., maintained/stored by the data item system/operating system), changing the location of data item a.txt from the first location (sector 10) to the second location (sector 100). The intermediate write mapping is then deleted from the memory. This avoids the need to overwrite sector 10 with a potentially large amount of data (reducing the time used to commit the request to overwrite). Instead, the location of data item a.txt within the storage space is changed from sector 10 to sector 100 (requiring a much smaller amount of time to commit the request to overwrite) such that any future requests for a.txt are routed to sector 100. In embodiments, this process may be considered promoting the intermediate write mapping to a permanent mapping for the location of the data item (e.g., the actual or non-intermediate mapping for the location of the data item).

Figure 3B:
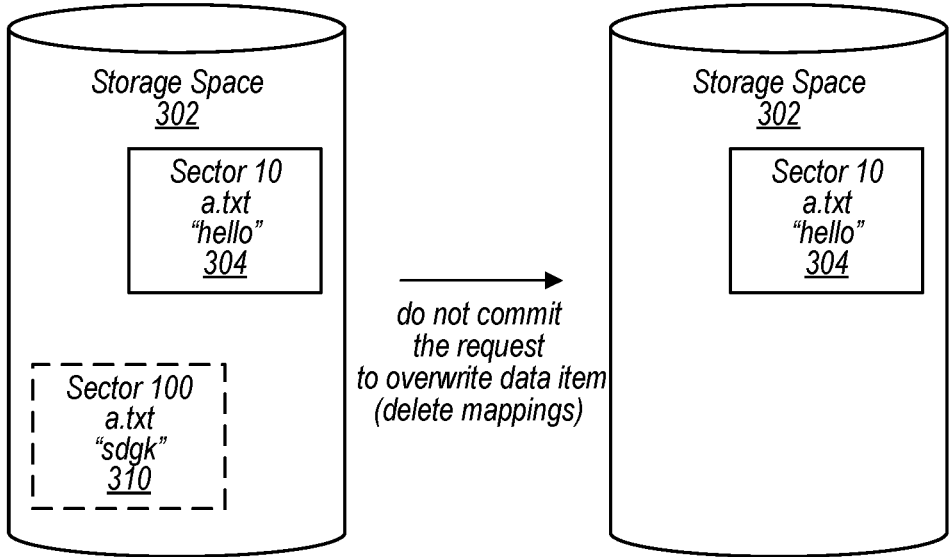
FIG. 3B is an illustration of contents of a volume before and after a determination to not commit an overwrite request, according to some embodiments.

FIG. 3B is an illustration of contents of a storage space before and after a determination to not commit a request to overwrite a data item, according to some embodiments.

The same/similar steps may be performed as in FIG. 3A to end up with intermediate mappings 308 and the data item data 304, 310 for the storage space 302 as shown on the left. However, in FIG. 3B, the storage driver determines not to commit the request to overwrite (this may be because the contents "sdgk" 310 at sector 100 are encrypted due to a ransomware attack). In response to determining not to commit the request to overwrite (e.g., based on any of the techniques described herein), as shown on the right, the data item a.txt at sector 10 is not overwritten, the data item a.txt at sector 100 is deleted, and the intermediate write mapping (10:100) is deleted from the memory.

Figure 4A:
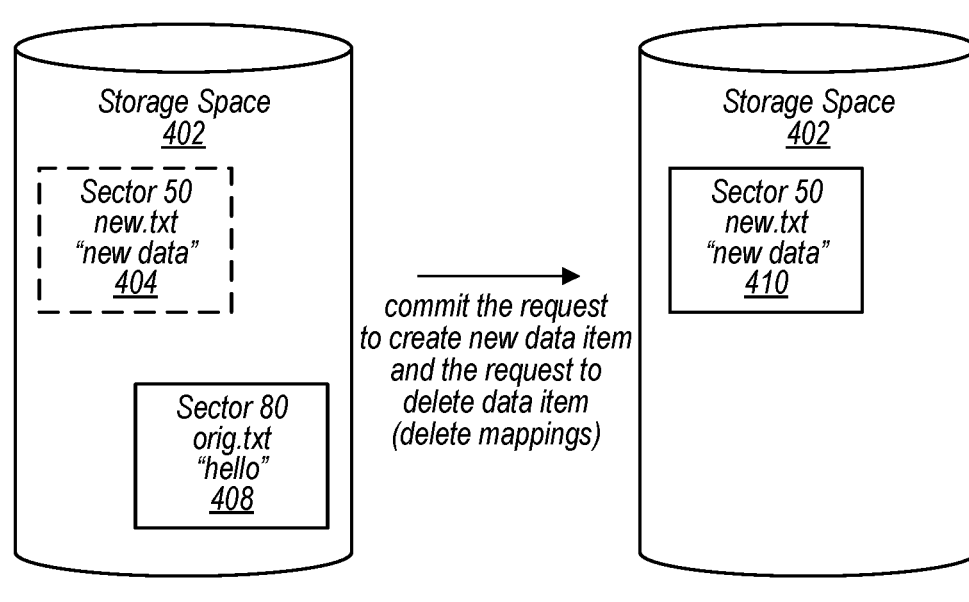
FIG. 4A is an illustration of contents of a volume before and after a determination to commit a create request and a delete request, according to some embodiments.

FIG. 4A is an illustration of contents of a storage space before and after a determination to commit a request to create a new data item and a request to delete a data item, according to some embodiments.

In the depicted example, in response to receiving a request to create a new data item that indicates/includes the data item data "new data," the storage driver creates a new data item at a location (sector 50) of a storage space 402 (the data item new.txt, which includes the data item data "new data" 404). The storage driver may generate an intermediate create mapping in intermediate mappings 406, wherein the intermediate create mapping associates the location (sector 50) with the request to create the new data item, represented as "50:n" in the depicted example. The storage driver may then store the intermediate create mapping to a memory (e.g., to RAM or another data store).

In response to receiving a request to delete a data item (orig.txt with the data item data "hello" 408) at a location (sector 80) of storage space 402, the storage driver may generate an intermediate delete mapping in intermediate mappings 406, wherein the intermediate delete mapping associates the location (sector 80) with the request to delete the data item, represented as "80:d" in the depicted example. The storage driver may then store the intermediate delete mapping to a memory (e.g., to RAM or another data store).

The storage driver may determine to commit the request to create the new data item (e.g., in response to receiving a user request to create the new data item via the management interface). In response, data item the intermediate write mapping (50:n) is deleted from the memory. Since there is no longer an intermediate write mapping associating the location (sector 50) with the request to create a new data item, the data item new.txt has been committed. The storage driver may also determine to commit the request to delete the data item orig.txt (e.g., in response to receiving a user request to delete the data item via the management interface). In response, as shown on the right, the data item orig.txt is deleted from the storage space and the intermediate delete mapping (80:d) is deleted from memory.

Figure 4B:
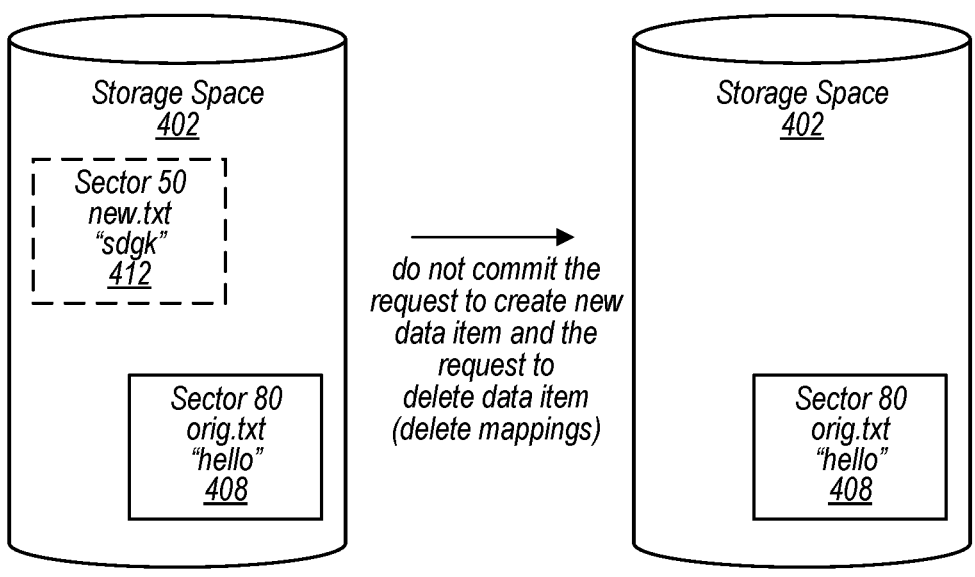
FIG. 4B is an illustration of contents of a volume before and after a determination to not commit a create request and a delete request, according to some embodiments.

FIG. 4B is an illustration of contents of a storage space before and after a determination to not commit a request to create a new data item and a request to delete a data item, according to some embodiments.

The same/similar steps may be performed as in FIG. 4A to end up with intermediate mappings 406 and the data item data 412, 408 for the storage space 402 as shown on the left. However, in FIG. 4B, the storage driver determines not to commit the request to create the new data item that indicates/ includes the data item data "sdgk" (this may be because the contents "sdgk" 412 at sector 50 are encrypted due to a ransomware attack). For example, a user request may be received via the management interface to not commit the request to create the new data item. In response to determining not to commit the request to create the new data item, as shown on the right, the data item new.txt at sector 50 is deleted, and the intermediate create mapping (50:n) is deleted from the memory. In response to determining not to delete the data item orig.txt (this may be because the ransomware attack was identified), the data item orig.txt remains stored on the storage space and the intermediate delete mapping (80:d) is deleted from memory. For example, a user request may be received via the management interface to not commit the request to delete the data item.

In some embodiments, a system may be capable of performing some or all of the techniques discussed in FIGS. 1-10 in order to prevent data loss from ransomware. For example, a system may be capable of performing techniques discussed for FIGS. 3A and 3B to handle overwrite attacks and/or techniques discussed for FIGS. 4A and 4B to handle delete-create attacks.

Figure 5:
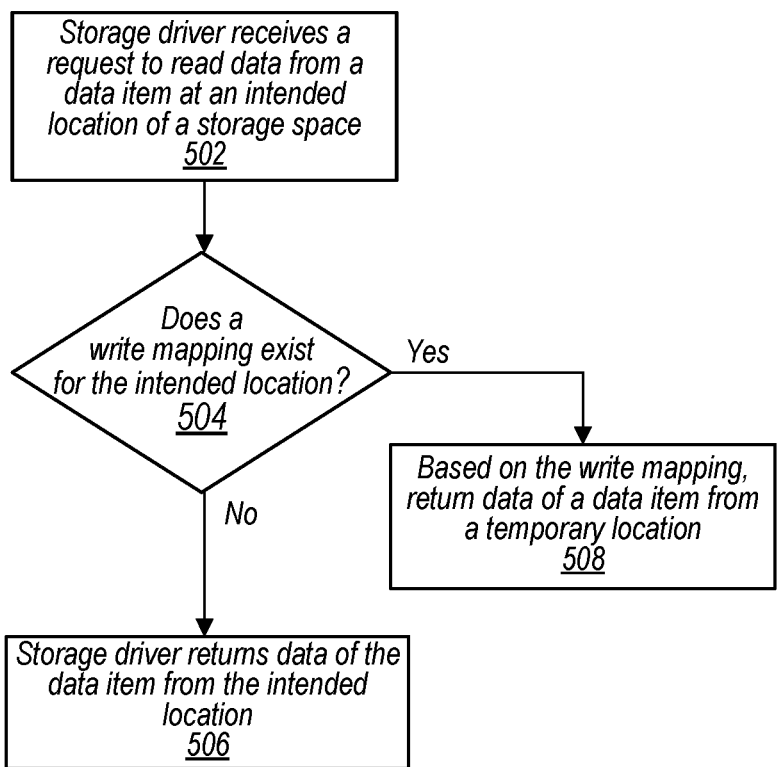
FIG. 5 is a high-level flowchart illustrating various methods and techniques for a storage driver to return data for a read request, according to some embodiments.

FIG. 5 is a high-level flowchart illustrating various methods and techniques for a storage driver to return data for a read request, according to some embodiments. In various embodiments, any of the functionality described for any portions of the flowcharts 5-10 may be performed by any of the components of FIGS. 1-4 and/or 11.

These techniques, as well as the techniques discussed with regard to FIGS. 6-10, may be implemented using components or systems as described above with regard to FIGS. 1-4, as well as other types of components or systems, and thus the following discussion is not intended to be limiting as to the other types of systems that may implement the described techniques. For example, any of the techniques may be implemented by the provider network and/or by a local service/application of a client network.

At block 502, a storage driver of a storage space receives a request to read data from a data item within the storage space. In response to the read request, the storage driver identifies an intended location of the data item within the storage space. The intended location could be determined based on any number of conventional data item mapping mechanisms. At block 504, the storage driver determines whether an intermediate write mapping exists for the intended location (e.g., whether there are any intermediate write mappings stored in the memory for the intended location). If not, then at block 506, the storage driver returns the data of the data item from the intended location. At block 504, if the storage driver determines that an intermediate write mapping does exist for the location (e.g., there is an intermediate write mapping stored in the memory for the location), then at block 508, the storage driver, based on the intermediate write mapping, returns data of a data item from a temporary location (e.g., another location indicated by the intermediate write mapping that is used to temporarily store data until the data is committed or not committed).

Figure 6:
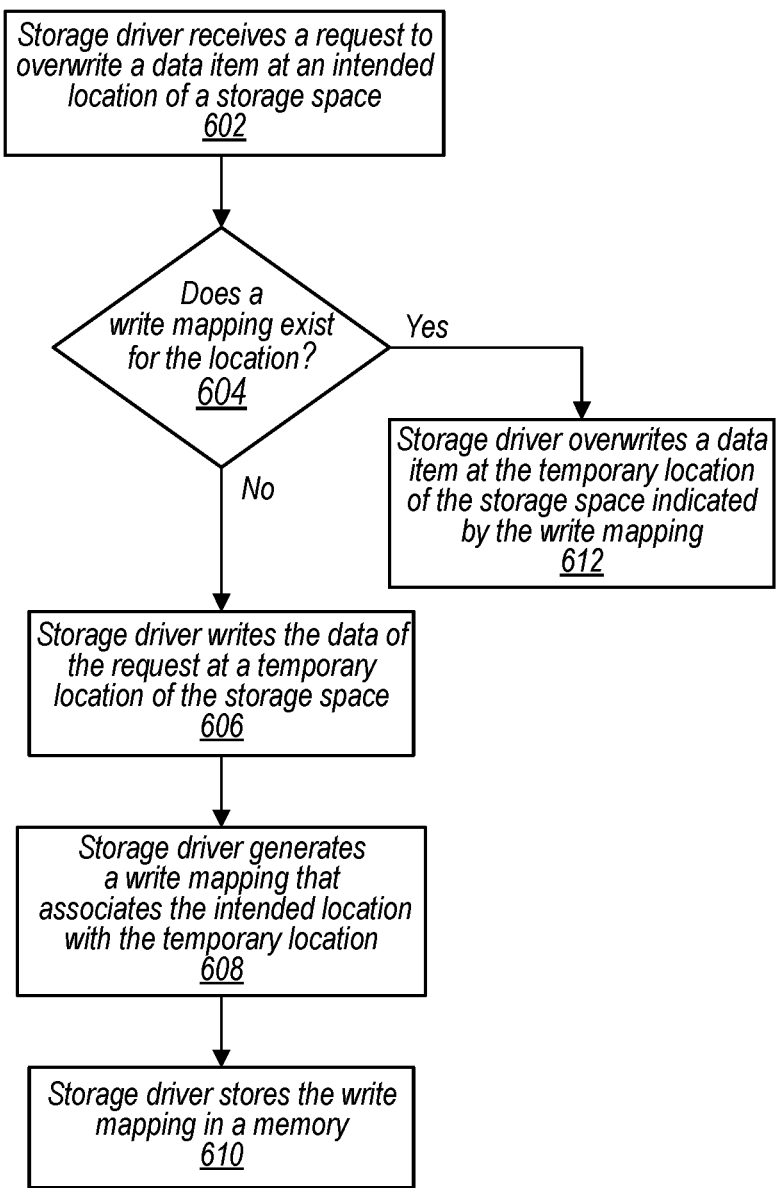
FIG. 6 is a high-level flowchart illustrating various methods and techniques for a storage driver to store data for an overwrite request, according to some embodiments.

FIG. 6 is a high-level flowchart illustrating various methods and techniques for a storage driver to store data for a request to overwrite a data item, according to some embodiments.

At block 602, the storage driver receives a request to overwrite a data item at an intended location of a storage space. At block 604, the storage driver determines whether an intermediate write mapping exists for the intended location. If not, then at block 606, the storage driver writes the data of the request at a temporary location of the storage space (e.g., a different location). At block 608, the storage driver generates an intermediate write mapping that associates the intended location with the temporary location. This could take the form of, for example, a table with one column representing potential intended locations and another column representing associated temporary locations; a list of tuples where one element of the tuple represents the intended location of an associated data item or object while the other element represents a temporary location; or any other representation suitable for associating an intended location with a corresponding temporary location.

At block 610, the storage driver stores the intermediate write mapping to a memory. Returning to block 604, if the storage driver determines that an intermediate write mapping already exists for the intended location, then at block 612, the storage driver overwrites a data item at the temporary location of the storage space indicated by the intermediate write mapping.

Figure 7:
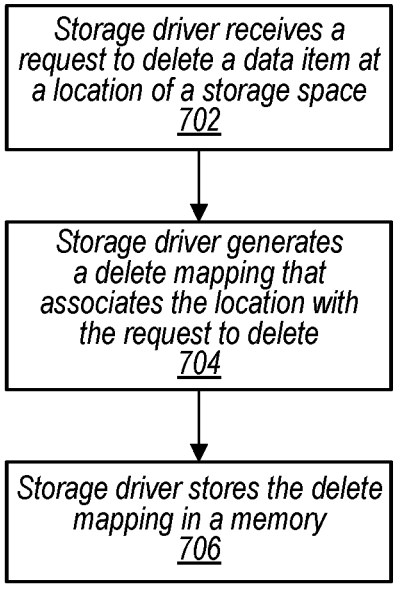
FIG. 7 is a high-level flowchart illustrating various methods and techniques for a storage driver to generate an intermediate delete mapping based on a delete request, according to some embodiments.

FIG. 7 is a high-level flowchart illustrating various methods and techniques for a storage driver to generate an intermediate delete mapping based on a request to delete a data item, according to some embodiments.

At block 702, the storage driver receives a request to delete a data item at a location of a storage space. At block 704, the storage driver generates an intermediate delete mapping that associates the location with the request to delete. At block 706, the storage driver stores the intermediate delete mapping in a memory.

Figure 8:
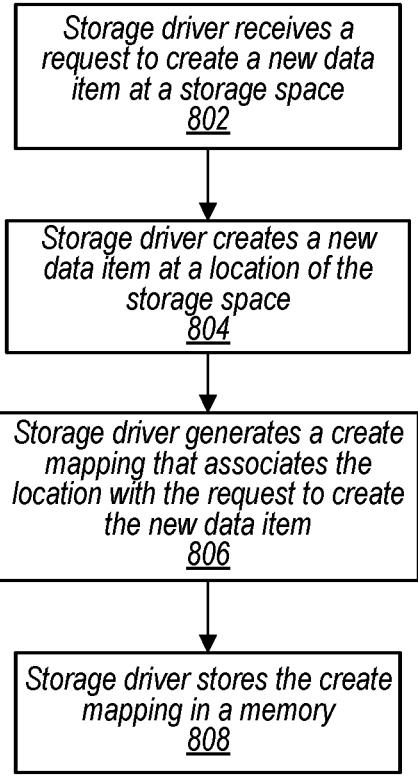
FIG. 8 is a high-level flowchart illustrating various methods and techniques for a storage driver to create a new data item and to generate an intermediate create mapping based on a create request, according to some embodiments.

FIG. 8 is a high-level flowchart illustrating various methods and techniques for a storage driver to create a new data item and to generate an intermediate create mapping based on a request to create a new data item, according to some embodiments At block 802, the storage driver receives a request to create a new data item at a storage space. At block 804, the storage driver creates a new data item at a location of the storage space (e.g., a temporary location). At block 806, the storage driver generates an intermediate create mapping that associates the location with the request to create a new data item. At block 808, the storage driver stores the intermediate create mapping in a memory.

Figure 9:
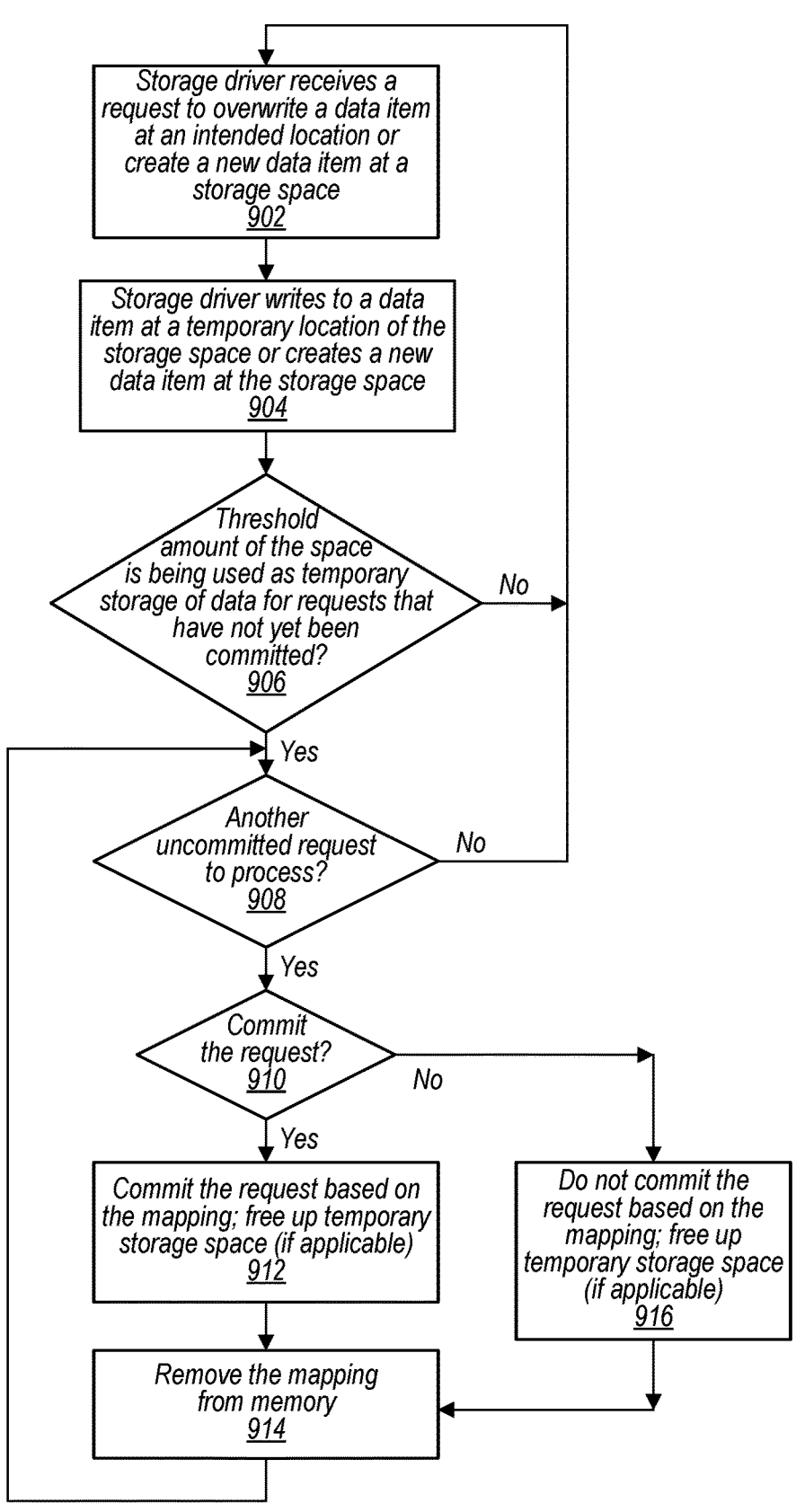
FIG. 9 is a high-level flowchart illustrating various methods and techniques for a storage driver to reduce the amount of a volume that is being used as temporary storage of data for requests that have not yet been committed, according to some embodiments.

FIG. 9 is a high-level flowchart illustrating various methods and techniques for a storage driver to reduce the amount of a storage space that is being used as temporary storage of data for requests that have not yet been committed, according to some embodiments.

At block 902, the storage driver receives a request to overwrite a data item at a location or to create a new data item at a storage space. At block 904, the storage driver writes to another data item at another location or creates a new data item at the storage space.

At block 906, the storage driver determines whether a threshold amount of the storage space is being used as temporary storage of data for requests that have not yet been committed. If not, then the process returns to block 902. If so, then at block 908, the storage driver determines whether there is another uncommitted request to process. If not, then the process returns to block 902. If so, then at block 910, the storage driver determines whether to commit the request (e.g., based on entropy, data item format, and/or user input as described herein).

If the storage driver determines to commit the request, then at block 912, the storage driver commits the request based on the intermediate mapping that was generated for the request. The storage driver may also free up (e.g., make available) temporary storage space (if applicable). For example, the storage driver may free up storage space that was used to store a temporary data item for an overwrite request (or the data at the original intended location if the optimized technique is used). At block 914, the storage driver removes (e.g., deletes) the intermediate mapping from the memory and the process returns to block 908. If the storage driver determines not to commit the request, then at block 916, the storage driver may free up storage space that was used to store a temporary data item for an overwrite request or free up storage space that was used to store a temporary data item for a create new data item request. At block 914, the storage driver removes (e.g., deletes) the intermediate mapping from the memory and the process returns to block 908.

FIG. 10 is a high-level flowchart illustrating various methods and techniques for a storage driver to automatically determine whether or not to commit a request to overwrite a data item based on one or more similarity checks, according to some embodiments.

At block 1002, the storage driver receives a request to overwrite a data item at a location. At block 1004, the storage driver writes to another data item at another location of the storage space. At block 1006, the storage driver generates an intermediate write mapping that associates the location with the other location. At block 1008, the storage driver stores the intermediate write mapping in the memory.

At block 1010, the storage driver performs the entropy check, simhash check, and/or the data item format check between the two locations and determines whether the data item two locations pass the entropy check, simhash check, and/or the data item format check as described herein). Therefore, in embodiments, one, two, or all three of the above checks may be performed. If the two locations pass the check(s), then at block 1012, the storage driver determines to commit the request. At block 1014, the storage driver, based on the intermediate write mapping, overwrites the data item with data from the other location. As discussed herein, in some embodiments the storage driver may perform an improved/optimized technique instead (e.g., updating the data item location to be the temporary location instead of the original intended location of the data item). The above examples of similarity checks (entropy check, simhash check, data item format check) are just some known examples of similarity checks that may be performed. In various embodiments, other similarity check(s) and corresponding similarity threshold(s) may be used in place of these illustrative ones without departing from the scope of the disclosure.

At block 1016, the storage driver deletes the intermediate write mapping from the memory. Returning to block 1010, if the storage driver determines that the two locations do not pass the data item check(s), then at block 1018, the storage driver determines not to commit the request and may send a notify to the user of a ransomware attack. At block 1016, the storage driver deletes the intermediate write mapping from the memory.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors.

The program instructions may implement the functionality described herein (e.g., the functionality of the storage service, storage driver, and any other components/devices that implement the techniques described herein). The various methods as illustrated in the figures and described herein represent example embodiments of methods. The order of any method may be changed, and various elements may be added, reordered, combined, omitted, modified, etc.

Figure 11:
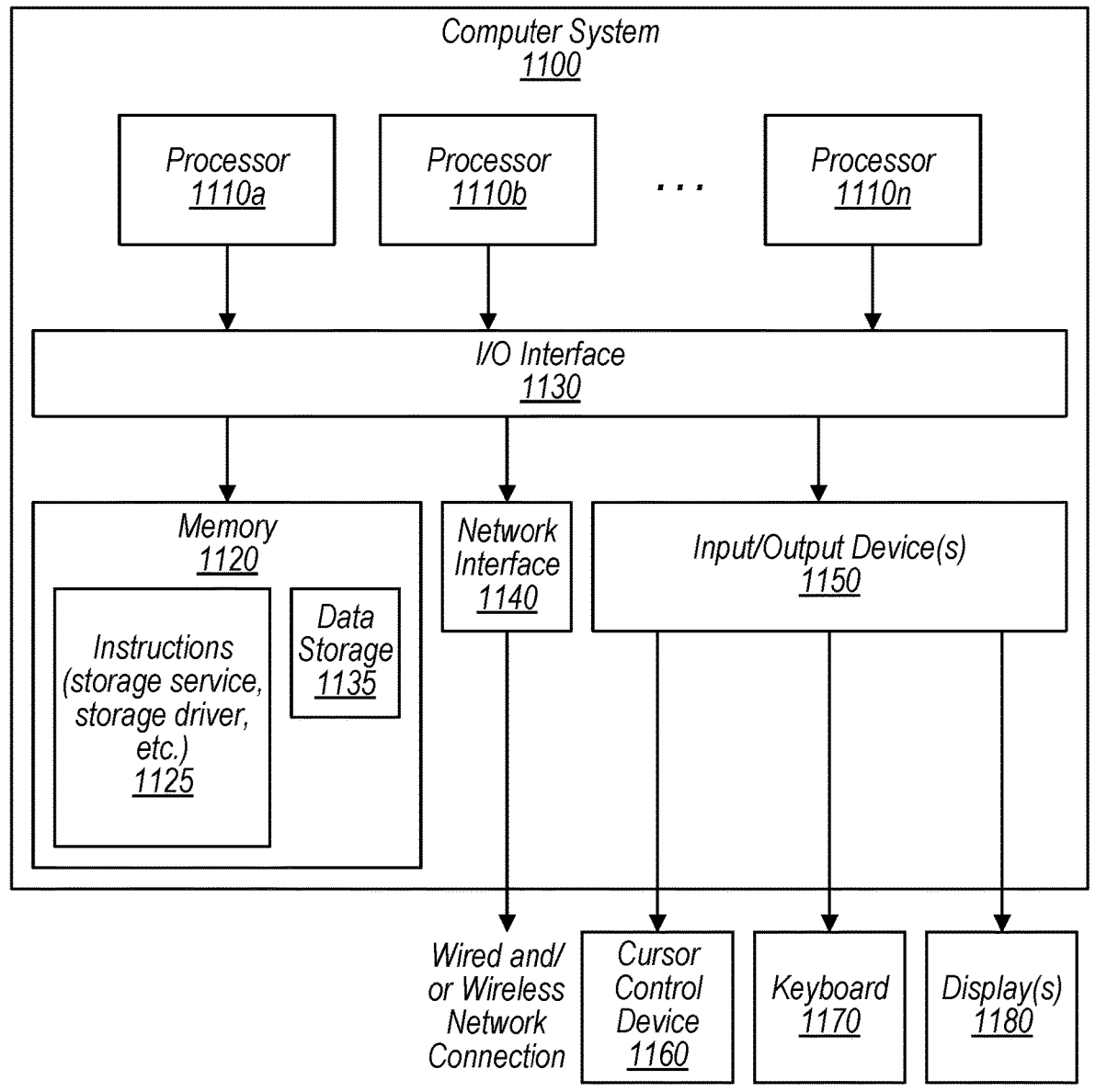
FIG. 11 is a block diagram illustrating an example computing system, according to some embodiments.

Embodiments to implement using intermediate mappings to prevent data loss from ransomware as described herein may be executed on one or more computer systems, which may interact with various other systems or devices. One such computer system is illustrated by FIG. 11. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. Display(s) may include standard computer monitor(s) and/or other display systems, technologies or devices, in one embodiment. In some embodiments, it is contemplated that embodiments may be implemented using a single instance of computer system 1100, while in other embodiments multiple such systems, or multiple nodes making up computer system 1100, may host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions, in one embodiment. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

In some embodiments, at least one processor 1110 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1120 may store program instructions 1125 and/or data accessible by processor 1110, in one embodiment. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the storage service, storage driver, and any other components/devices, etc.) are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100.

A computer-accessible medium may include non-transitory storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140, in one embodiment.

In one embodiment, I/O interface 1130 may be coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may allow data to be exchanged between computer system 1100 and other devices attached to a network, such as other computer systems, or between nodes of computer system 1100, in one embodiment. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100, in one embodiment. Multiple input/output devices 1150 may be present in computer system 1100 or may be distributed on various nodes of computer system 1100, in one embodiment. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125 that implement the various embodiments of the systems as described herein, and data store 1135, comprising various data accessible by program instructions 1125, in one embodiment. In one embodiment, program instructions 1125 may include software elements of embodiments as described herein and as illustrated in the Figures. Data storage 1135 may include data that may be used in embodiments (e.g., intermediate mappings, data of a data item, configuration data, etc.). In other embodiments, other or different software elements and data may be included.

Those skilled in the art will appreciate that computer system 1100 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device.

Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above.

In some embodiments, instructions stored on a computer-readable medium separate from computer system 1100 may be transmitted to computer system 1100 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

one or more processors and one or more memories, wherein the one or more memories have stored thereon instructions, which when executed by the one or more processors, cause the one or more processors to implement a storage service for a plurality of clients of a provider network, wherein the storage service is configured to:

process an overwrite request to overwrite an existing data item located at a first location of a storage space with a new data item indicated by the overwrite request by:

writing the new data item to a second location of the storage space;

generating an intermediate write mapping that associates the first location of the existing data item with the second location that the new data item was written to based on the overwrite request to overwrite the existing data item;

storing the intermediate write mapping to enable the storage service to serve read requests for the existing data item with the new data item;

determining whether to commit the overwrite request to overwrite the existing data; and in response to determining to commit the overwrite request to overwrite the existing data item at the first location with the new data item indicated by the overwrite request:

overwriting the existing data item at the first location with the new data item that was previously stored at the second location based on reception of the overwrite request to overwrite the existing data item and delete the intermediate write mapping that indicates an association between the first location of the existing data item and the second location that the new data item was written to, or updating data item location information of the existing data item to indicate the second location that the new data item was previously stored at based on reception of the overwrite request instead of the first location of the existing data item, deleting the existing data item at the first location, and deleting the intermediate write mapping that indicates the association between the first location of the existing data item and the second location that the new data item was previously stored at based on the reception of the overwrite request; and in response to determining not to commit the overwrite request:

deleting the new data item and the intermediate write mapping.

2. The system as recited in claim 1, wherein to determine to commit the request to overwrite, the storage driver is further configured to:

determine that a format of the existing data item at the first location is a same format as a format of the new data item at the second location, determine that a measurement of entropy of data of the existing data item at the first location is within a predefined entropy threshold of a measurement of entropy of data of the new data item at the second location, or determine that a simhash of the data at the first location is within a predefined similarity threshold of a simhash of the data at the second location.

3. The system as recited in claim 1, wherein to determine not to commit the overwrite request, the storage service is further configured to:

determine that a format of the existing data item at the first location is not a same format as a format of the new data item at the second location.

4. The system as recited in claim 1, wherein to determine not to commit the overwrite request, the storage service is further configured to:

determine that a measurement of entropy of data of the existing data item at the first location is within a predefined entropy threshold of a measurement of entropy of data of the new data item at the second location, or determine that a simhash of the data at the first location is within a predefined similarity threshold of a simhash of the data at the second location.

5. The system as recited in claim 1, wherein the storage service is further configured to:

receive the overwrite request from a compute instance established by the provider network and associated with the client.

6. A method, comprising:

performing, by a storage driver implemented by one or more computing devices:

receiving an overwrite request to overwrite an existing data item at a first location of a storage space with a new data item indicated by the overwrite request;

in response to receiving the overwrite request:

writing the new data item to a second location of the storage space;

generating an intermediate write mapping that associates the first location of the existing data item with the second location that the new data item was written to based on the overwrite request to overwrite the existing data item; and storing the intermediate write mapping;

determining to commit the overwrite request; and in response to determining to commit the overwrite request to overwrite the existing data item at the first location with the new data item indicated by the overwrite request:

overwriting the existing data item at the first location with the new data item that was previously stored at the second location based on reception of the overwrite request to overwrite the existing data item and deleting the intermediate write mapping that indicates an association between the first location of the existing data item and the second location that the new data item was written to, or updating data item location information of the existing data item to indicate the second location that the new data item was previously stored at based on reception of the overwrite request instead of the first location of the existing data item, deleting the existing data item at the first location, and deleting the intermediate write mapping that indicates the association between the first location of the existing data item and the second location that the new data item was previously stored at based on the reception of the overwrite request.

7. The method as recited in claim 6, wherein determining to commit the overwrite request comprises:

determining that a measurement of entropy of data of the existing data item at the first location is within a predefined entropy threshold of a measurement of entropy of data of the new data item at the second location, or determining that a simhash of the data at the first location is within a predefined similarity threshold of a simhash of the data at the second location.

8. The method as recited in claim 6, wherein determining to commit the overwrite request comprises:

determining that a format of the existing data item at the first location is a same format as a format of the new data item at the second location.

9. The method as recited in claim 6, wherein determining to commit the overwrite request comprises:

receiving, from a user, an indication to commit the overwrite request.

10. The method as recited in claim 6, wherein the one or more computing devices are hosted by a provider network, wherein the storage space is associated with a client of the provider network, and wherein determining to commit the overwrite request comprises:

receiving, from the client, an indication to commit the overwrite request.

11. The method as recited in claim 6, further comprising performing, by the storage driver, prior to the receiving of the overwrite request:

in response to receiving a read request to read the existing data item, determining that there are no intermediate write mappings stored for the first location; and in response to determining that there are no intermediate write mappings stored for the first location, return data of the existing data item.

12. The method as recited in claim 6, further comprising performing, by the storage driver:

receiving a create request to create a new data item, wherein the create request indicates the new data item; and in response to receiving the create request:

creating the new data item at a third location of the storage space;

generating an intermediate create mapping, wherein the intermediate create mapping associates the third location with the create request; and storing the intermediate create mapping.

13. The method as recited in claim 6, further comprising performing, by the storage driver:

receiving another overwrite request to overwrite another existing data item at a third location of the storage space with another new data item indicated by the other overwrite request;

in response to receiving the other overwrite request, writing the other new data item to a fourth location of the storage space;

based on the writing of the other data item to the storage space, determining that a threshold amount of the storage space is being used as temporary storage of data for requests that have not yet been committed; and in response to determining that the threshold amount of the storage space is being used as temporary storage of data for requests that have not yet been committed, asking a user whether to commit one or more of the requests that have not yet been committed.

14. The method as recited in claim 6, further comprising performing, by the storage driver:

receiving a delete request to delete another data item at a third location of the storage space;

in response to receiving the delete request:

generating an intermediate delete mapping, wherein the intermediate delete mapping associates the third location with the delete request; and storing the intermediate delete mapping;

determining to commit the delete request; and in response to determining to commit the delete request:

deleting the other data item and deleting the intermediate delete mapping.

15. One or more non-transitory computer-accessible storage media storing program instructions that when executed on or across one or more processors cause the one or more processors to:

receive a delete request to delete an existing data item at a particular location of a storage space;

in response to reception of the delete request:

generate an intermediate delete mapping, wherein the intermediate delete mapping associates the particular location of the storage space indicated by the previously received delete request with the previously received delete request; and store the intermediate delete mapping;

determine to commit the delete request; and in response to the determination to commit the delete request to delete the existing data item at the particular location:

delete the existing data item at the particular location; and delete the intermediate delete mapping that indicates an association between the particular location of the data item indicated by the previously received delete request and the previously received delete request.

16. The one or more storage media as recited in claim 15, wherein to determine to commit the delete request, the program instructions when executed on or across the one or more processors further cause the one or more processors to:

receive, from a user, an indication to commit the delete request.

17. The one or more storage media as recited in claim 15, wherein the program instructions when executed on or across the one or more processors further cause the one or more processors to:

receive another delete request to delete another data item at another location of the storage space;

in response to reception of the other delete request:

generate another intermediate delete mapping that associates the other location with the other delete request; and store the other intermediate delete mapping;

receive, from a user, an indication to not commit the other delete request; and in response to the reception of the indication to not commit the other delete request, delete the other intermediate delete mapping.

18. The one or more storage media as recited in claim 15, wherein the one or more edge devices comprises a plurality of edge devices, and wherein the program instructions when executed on or across the one or more processors further cause the one or more processors to:

receive a create request to create a new data item based at least on the existing data item; and in response to reception of the create request:

create the new data item at another location of the storage space;

generate an intermediate create mapping, wherein the intermediate create mapping associates the other location with the create request; and store the intermediate create mapping; and determine to commit the create request; and in response to the determination to commit the create request:

delete the intermediate create mapping.

19. The one or more storage media as recited in claim 15, wherein the program instructions when executed on or across the one or more processors further cause the one or more processors to:

receive an overwrite request to overwrite an existing data item at a first location of the storage space with a new data item indicated by the overwrite request;

in response to the reception of the overwrite request, write the new data item to a second location of the storage space;

based on the writing of the new data item to the storage space, determine that a threshold amount of the storage space is being used as temporary storage of data for requests that have not yet been committed; and in response to the determination that the threshold amount of the storage space is being used as temporary storage of data for requests that have not yet been committed, asking a user whether to commit one or more of the requests that have not yet been committed.

20. The one or more storage media as recited in claim 15, the program instructions when executed on or across the one or more processors further cause the one or more processors to:

in response to reception of a read request to read an existing data item at a first location, determine that there is an intermediate write mapping stored for the first location; and in response to the determination that there is an intermediate write mapping stored for the first location, return another data item of a second location.

* * * * *